United States Patent [19]
Onda

[11] Patent Number: 5,077,811
[45] Date of Patent: Dec. 31, 1991

[54] CHARACTER AND PICTURE IMAGE DATA PROCESSING SYSTEM

[75] Inventor: Masanori Onda, Iwatsuki, Japan

[73] Assignee: Fuji Xerox Co., Ltd., Tokyo, Japan

[21] Appl. No.: 597,089

[22] Filed: Oct. 10, 1990

[51] Int. Cl.$^5$ ............................................. G06K 9/32
[52] U.S. Cl. ........................................ 382/46; 382/44
[58] Field of Search ................................. 382/46, 44; 340/146.3 H, 146.3 Y

[56] References Cited

U.S. PATENT DOCUMENTS

| | | | |
|---|---|---|---|
| 4,251,799 | 2/1981 | Jih | 382/46 |
| 4,437,121 | 3/1984 | Taylor et al. | 382/46 |
| 4,533,959 | 8/1985 | Sakurai | 382/46 |
| 4,618,991 | 10/1986 | Tabata et al. | 382/46 |
| 4,984,280 | 1/1991 | Abe | 382/46 |

Primary Examiner—Stephen Brinich
Attorney, Agent, or Firm—Oblon, Spivak, McClelland, Maier & Neustadt

[57] ABSTRACT

An image processing system including image reading device such as an image scanner for reading an image on a document to produce image signals, a memory for storing the image signals, a data processing unit for processing the image signals. The data processing unit includes a character image discriminating function for discriminating a character image from a picture image, an image orientation detecting function for detecting orientation of the character image to determine whether the orientation of the character image is in a correct orientation, and an image rotation function for processing the image signals to rotate the image so that the image is correctly oriented.

6 Claims, 4 Drawing Sheets

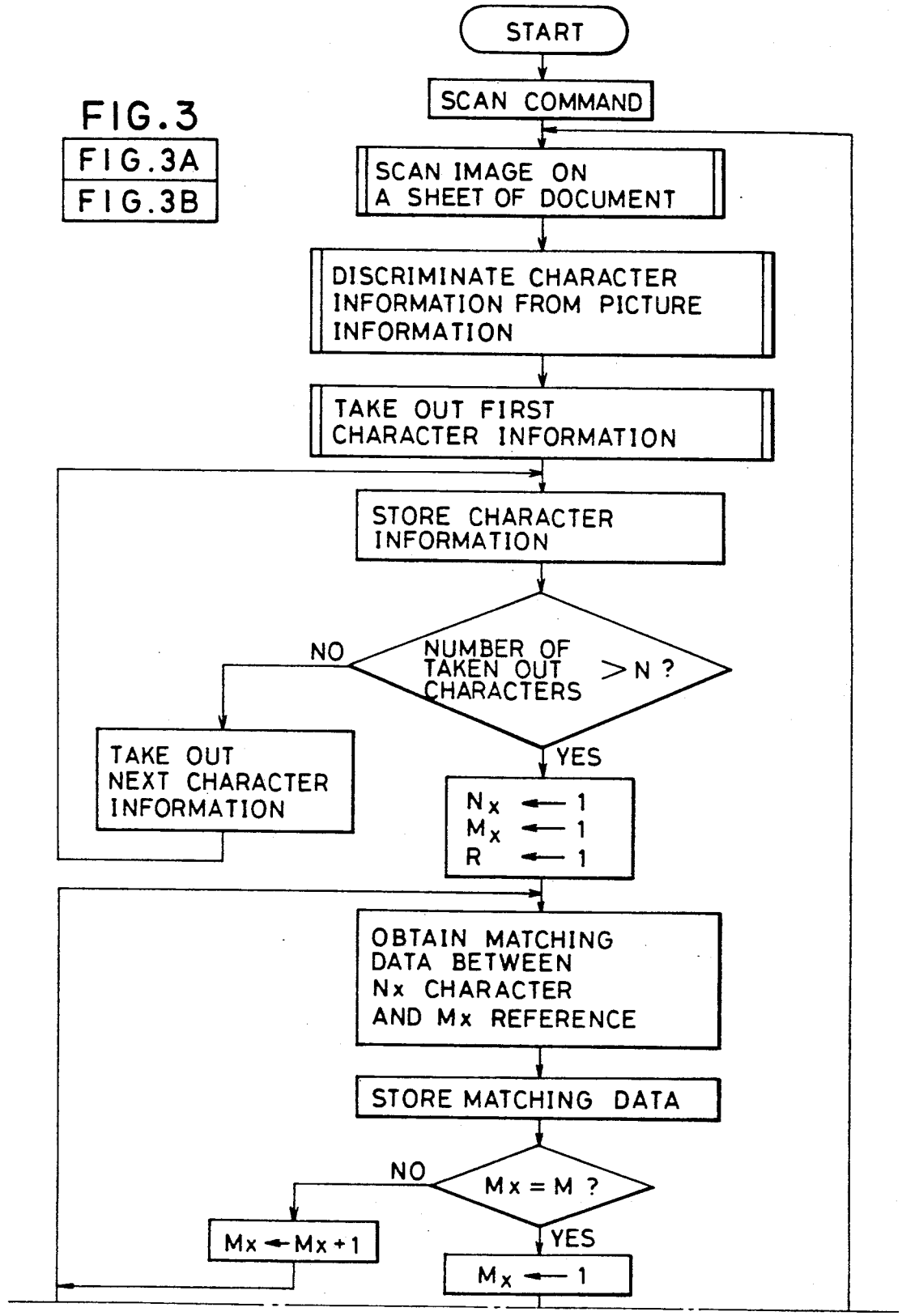

CHARACTER AND PICTURE IMAGE DATA PROCESSING SYSTEM

BACKGROUND OF THE INVENTION

1. Field of the Invention

The present invention relates to an image processing system, and more particularly to an image processing system for processing image data including data for picture images and data for character images. More particularly, the present invention pertains to an image processing system having a function of rotating images.

2. Description of the Prior Art

The network system developed by Xerox Corporation includes an image scanner which is connected with a work station which is in turn connected with a local network such as an Ethernet local network. The image scanner functions to scan a document which is placed on a platen of the scanner to produce signals corresponding to the image on the document which is being scanned. The image signals are then transmitted through the network to a memory unit such as a file server which is also connected with the network. The network system further includes a printing system having a print server connected with the network. Thus, the image on the document which has been scanned by the image scanner can be reproduced by the printing system in the network system.

In this type of system, the image scanner is usually of a limited size so that it can scan documents of a limited sheet size. In the case where the image scanner is designed to accommodate for a document size up to for example A4 and the nominal orientation of the document sheet is vertical, a 90° rotated image will be read in the case where a document of a sheet size of A4 has an image which is prepared with the nominal orientation horizontal. Further, in the case where a document is placed upside down on the image scanner, an inverted image will be read.

It has already been known to rotate an image for a desired angle of rotation for example 90°. An example of such image rotation system is disclosed by the Japanese laid-open patent application No. Sho 60-126769 which has laid-open to public inspection on July 6, 1985. In the case where the image scanner is provided with such image rotation system, it may be possible to process the image signals so that the resultant image can be rotated to possess a correct orientation. Alternatively, it may be possible to provide such image rotating system in the work station or in the file server.

It should however be noted that even when the image scanner or other part of the network system is provided with the image rotation system, the user of the system has to operate so that the image is rotated to the correct orientation. Further, the user of the system is also required to make a judgment as to which direction the image shall be rotated. It should however be noted that the direction of rotation required for the correction of the orientation of the image cannot be known in a system which is not provided with a display for showing the image which has just been scanned. Even if the system is provided with a display, it will be required to first scan the image and apply a command for the rotation of the image. It will thereafter be required to affirm the result of the image rotation. Thus, the use of the system is troublesome and improvement is therefore desired.

SUMMARY OF THE INVENTION

It is therefore an object of the present invention to provide an image rotation device which can discriminate that the scanned image is not in a correct orientation and can correct the orientation whenever it is judged that the orientation is not correct.

Another object of the present invention is to provide an image scanning system for scanning images which includes pictures and characters in which character images are picked up and discrimination is made as to whether the images are not correctly oriented based on the orientations of the character images.

A further object of the present invention is to provide an image scanning system in which the orientation of an image can be automatically detected and corrected whenever required.

According to the present invention, the above and other objects can be accomplished by an image processing system including image reading means for reading an image on a document to produce image signals, memory means for storing said image signals, data processing means for processing said image signals, said data processing means including character image discriminating means for discriminating a character image from a picture image orientation detecting means for detecting orientation of said character image to determine whether the orientation of the character image is in a correct orientation, image rotation means for processing said image signals to rotate the image so that the image is correctly oriented.

The character image can be discriminated in accordance with a known system. One example of such known system is disclosed by the Japanese laid-open patent application Sho 59-788 which has been disclosed for public inspection on Jan. 5, 1984. According to the system disclosed by the Japanese patent application, the image on a document is scanned and processed to break the image signal into vertical components and horizontal components. Then, vertical and horizontal components which are crossed each other are gathered into one interlinked group and the overall length of the components in the interlinked group is measured. Judgment is then made based on the principle that a picture image generally has a longer or greater overall length than a character image has. Thus, the image is classified as being a character image in the case where the overall length of the interlinked components is smaller than a predetermined value. It will be understood that the known system for discriminating a character image from a picture image can be used in the present invention without any problem.

The rotation of the image can be made in various known ways. One typical example for rotating an image is disclosed by the previously cited Japanese laid-open patent application Sho 60-126769. According to the system disclosed by the Japanese patent application, the image signals are stored in a binary form in a matrix and binary signals are transferred to points in the matrix which are appropriate for rotating the image. This system can be adopted in the system of the present invention as the image rotation means.

The image reading means may be image scanning means for scanning the image on the document. A raster scanning means may be the most typical one.

The image orientation detecting means may be provided based on a pattern matching method. A first predetermined number of character images may be selected for the detection of the orientation. A second predetermined number of reference characters are provided for comparison with the character images. The character images are sequentially compared with the reference characters to obtain matching data. Then, the character images are rotated for a first predetermined angle for example 90°. Thereafter, a similar step of comparing the character images with the reference characters is carried out to obtain matching data. Similar procedures are repeated with different rotation angles for example 180° and 270°. The matching data obtained with the respective rotation angles of the character images are then compared with each other and the rotation angle having the largest value of the matching data is taken as representing the orientation of the character images. Thereafter, the image is rotated by an angle necessary to correct the orientation of the scanned image.

The above and other objects and features of the present invention will become apparent from the description of a preferred embodiment taking reference to the accompanying drawings.

DESCRIPTION OF THE PREFERRED EMBODIMENT

Figure 1:
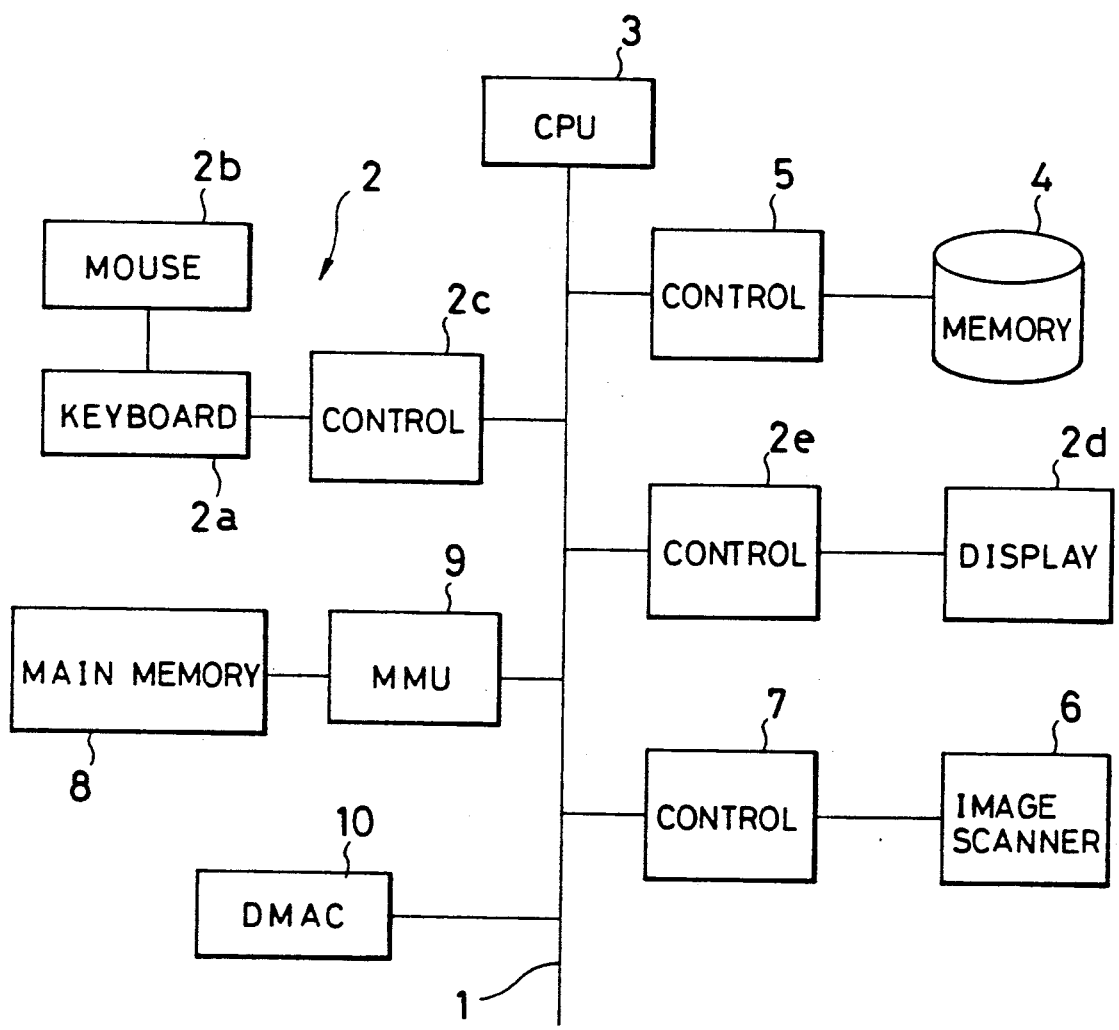
FIG. 1 is a block diagram showing the arrangement of the image processing system.
Figure 2A:
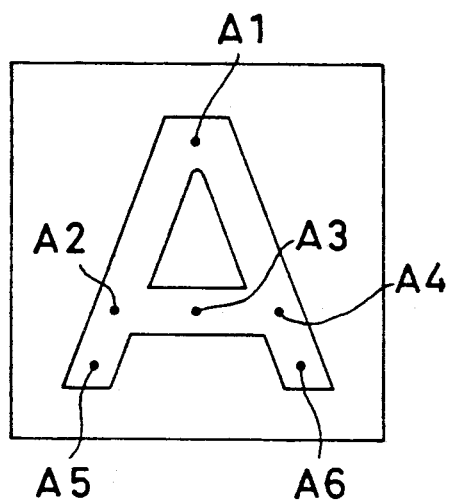
FIGS. 2 (a), (b), (c) and (d) show examples of obtaining matching data by comparing character images with reference characters; and, FIGS. 3A-3B are functional flow charts showing the operation of the system in accordance with the present invention.
Figure 2B:
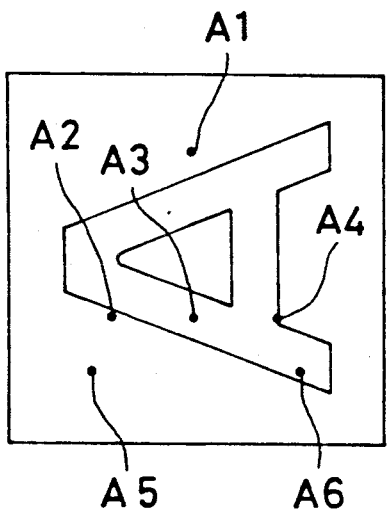
Figure 2C:
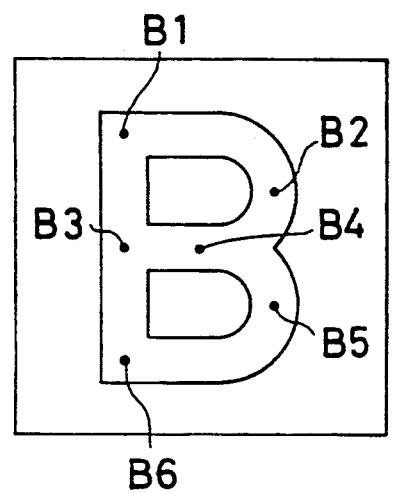
Figure 2D:
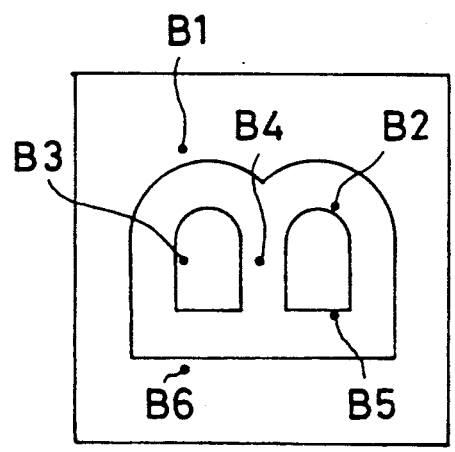

Referring to the drawings, particularly to FIG. 1, there is shown an image processing system including a bus 1 and a work station 2 which is connected with the bus 1. Although not shown in the drawings, a required number of work stations may be connected to the bus 1. The work station 2 includes a keyboard 2a, mouse 2b and a keyboard control unit 2c. A display 2d and a display control unit 2e are also associated with the work station 2. The keyboard 2a and the mouse 2b are connected through the keyboard control unit 2c with the bus 1. The display 2d is connected through the display control unit 2e with the bus 1.

There is also provided a central processing unit (CPU) 3 which is also connected with the bus 1. A magnetic disc type memory unit 4 is provided and connected with the bus 1 through a disc control unit 5. The illustrated system further includes an image scanner 6 for scanning an image on a document which is placed on the scanner 6. The image scanner is associated with a scanner control unit 7 through which the image scanner 6 is connected with the bus 1.

In order to temporarily store the image data which will be produced by the image scanner 6, there is provided a main memory unit 8 which is connected with the bus 1 through a memory management unit 9. A direct memory access controller 10 is provided and connected with the bus 1 for providing a high speed transfer of bulky data.

The memory unit 4 has a memory of a system program and the CPU functions to control the operation of the system in accordance with the program stored in the memory unit 4. The main memory 8 has a memory of a program required for processing the image data produced by the image scanner 6. The image data produced by the image scanner 6 as the result of scanning the image on the sheet of document on the image scanner 6 is examined as to whether the image is in a correct orientation or not. In the case where the image is found as being not in a correct orientation, the image data is rotated by a required angle in a required direction.

Figure 3B:
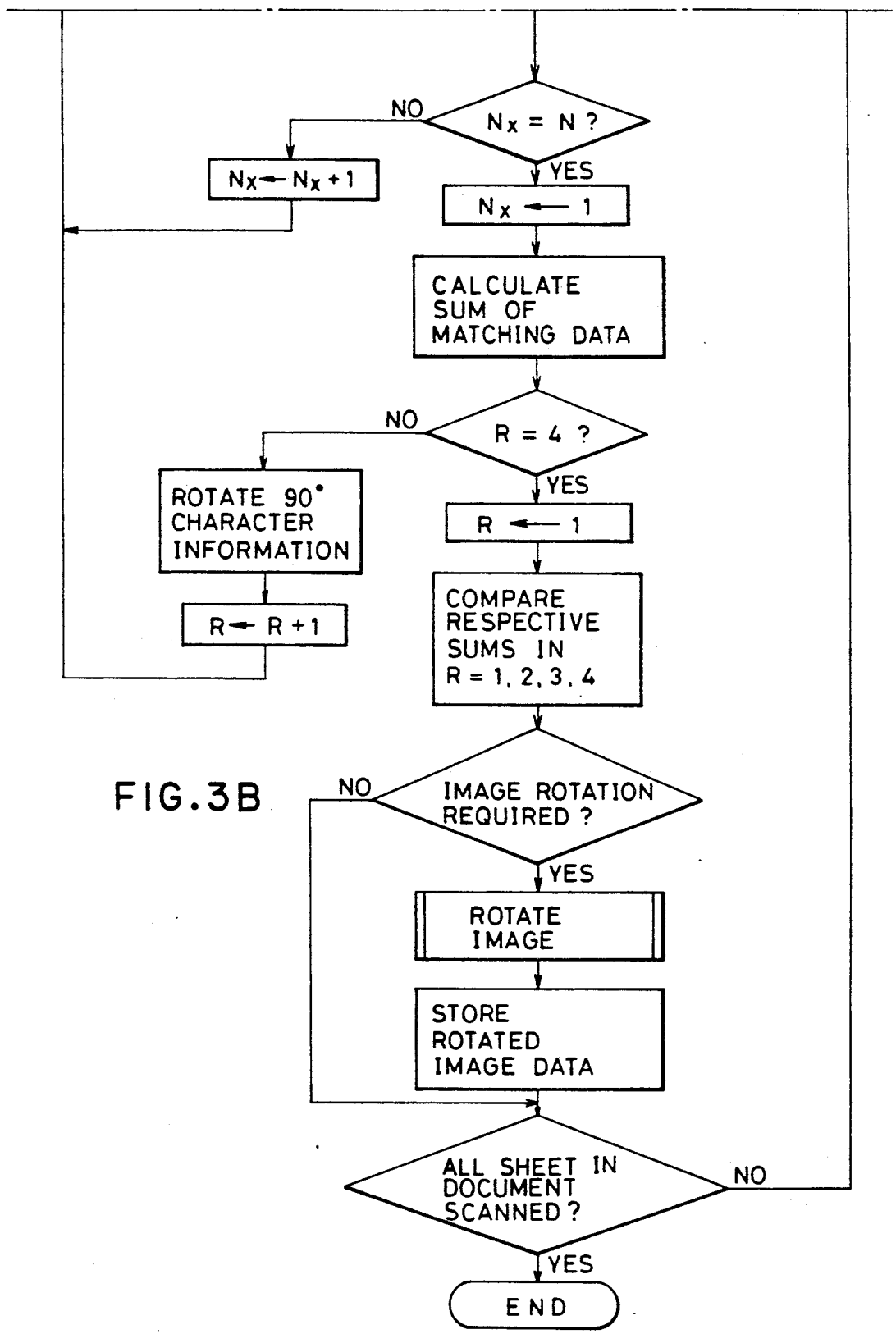

FIG. 3 shows a procedure for examining the orientation of the scanned image and rotating the image when required to correct the orientation of the image.

Referring to FIG. 3, a sheet of document having an image including picture information and character information is placed on the image scanner 6 and a command for scanning the image is given by the operator. Then, the image scanner 6 functions to scan the image on the sheet of the document which is laid on the image scanner 6. The CPU 3 then functions based on the program provided in the main memory 8 to discriminate the character information in the image data from the picture information. As already described, a known process such as that disclosed by the Japanese laid-open patent application Sho 59-788 may be adopted for the discriminating step. Among the image signals representing characters, those signals representing the first character are taken out. For this step of the operation, a known procedure may be adopted. The Japanese laid-open patent application Sho 58-101374 discloses a procedure which can be used for this step. The character signals thus taken out are stored in the main memory 8.

Thereafter, the number of characters of which signals are already taken out in the previous steps is counted and compared with a predetermined number N. If the aforementioned number of the characters is smaller than the number N, signals for the next characters are taken out and the same procedure is repeated. When the number of characters becomes equal to the number N, the number Nx, the number Mx and the number R are made 1. The number Nx represents the scanned character which is being compared with a reference character. The number Mx represents the reference character which is being compared with the scanned character. The number R represents the number of repetition of the procedure.

Thereafter, the first character is compared with the reference characters in sequence. FIG. 2 shows an example of procedure for comparing the scanned character with the reference characters. Referring to FIG. 2 (a), there are shown reference points A1 through A6 which are taken for recognizing the character A. In the case where the character A is correctly oriented, the scanned character will have image signals on all of the reference points A1 through A6. However, if the image of the character A is rotated by 90°, only a few of the reference points will have image signals as shown in FIG. 2 (b). Referring to FIG. 2 (c), there are shown reference points for the character B. In the case where the image is rotated by 90°, only a few of the reference points will have image signals as shown in FIG. 2 (d).

In this manner, the image signals for the first scanned character is compared with all of the reference characters. Matching data obtained as the result of the comparison is then stored in the main memory 8. Thereafter, the same procedure is carried out for the next scanned character to obtain matching data which is also stored in the main memory 8. The procedure is repeated until all of the characters taken out in the previous steps are compared with the reference characters. Then, calculation is made to obtain a sum of the matching data which is stored in the main memory 8.

Thereafter, the scanned characters are rotated by 90° and the same steps are repeated to obtain a sum of the matching data. Similar steps are repeated with rotation angles of 180° and 270° to obtain a sum of the matching data for each of the rotation angles. Then, the sums of the matching data for the respective rotation angles are compared and it is determined that the rotation angle having the largest value of the sum of the matching data represents the orientation of the image. Thus, it is determined as to whether rotation of the image will be required for correcting the orientation of the image.

When it is determined that a rotation of the image is required, the CPU 3 functions based on the program stored in the main memory 8 to rotate the image by an angle in the direction required for correcting the orientation. The rotation of the image can be made in any known process. For example, a procedure which has been disclosed by the Japanese laid-open patent application Sho 60-126769 may be adopted for the purpose. When the document has a plurality of sheets, images on all of the sheets are scanned and processed in the same manner.

The invention has thus been shown and described with reference to a preferred embodiment, however, it should be noted that the invention is in no way limited to the details of the arrangements as described but changes and modifications may be made without departing from the scope of the appended claims.

I claim:

1. An image processing system including image reading means for reading an image on a document to produce image signals, memory means for storing said image signals, and data processing means for processing said image signals, said data processing means including character image discriminating means for discriminating a character image from a picture image, orientation detecting means for comparing signals for a plurality of scanned characters with a plurality of reference characters to detect orientation of said character image to determine whether the orientation of the character image is in a correct orientation, and image rotation means for processing said image signals to rotate the image so that the image is correctly oriented.

2. An image processing system in accordance with claim 1 in which said image reading means is image scanning means.

3. An image processing system in accordance with claim 1, in which the last mentioned means is means for comparing signals for each of the plurality of said scanned characters with all of the reference characters to provide matching data between said signals and said reference characters.

4. An image processing system in accordance with claim 1, in which said image orientation detecting means is means for comparing signals for a plurality of scanned characters with a plurality of reference characters in each of a plurality of angular orientations of said scanned characters.

5. An image processing system in accordance with claim 5, in which the last mentioned means is means for comparing signals for each of the plurality of said scanned characters with all of the reference characters to provide matching data between said signals and said reference characters and comparing said matching data in respective angular orientations with each other for determining the orientation of the image as the angular orientation wherein the matching data is the largest.

6. A method for detecting an orientation of a character image, comprising steps of scanning a character to produce character image signals, comparing the character image signals with a plurality of reference characters to produce a first character matching data, modifying said character image signals to obtain second character image signals corresponding to an image which is rotated for a predetermined rotation angle, comparing the second character image signals with the plurality of said reference characters to produce a second character matching data, repeating the steps with different rotation angles to obtain a plurality of matching data, comparing said plurality of matching data each other and determining the rotation angle having a largest value of the matching data as the orientation of the image.

* * * * *